United States Patent [19]

Adamaitis

[11] Patent Number: 5,016,923
[45] Date of Patent: May 21, 1991

[54] EROSION RESISTANT ELBOW CONDUIT

[76] Inventor: Karl Adamaitis, 22913 SE. 47th St., Camas, Wash. 98607

[21] Appl. No.: 533,014

[22] Filed: Jun. 4, 1990

[51] Int. Cl.$^5$ .............................................. F16L 43/00
[52] U.S. Cl. ..................................... 285/127; 285/179
[58] Field of Search ................. 285/127, 179; 406/193

[56] References Cited

U.S. PATENT DOCUMENTS

| | | | |
|---|---|---|---|
| 1,108,918 | 9/1914 | Lob | 285/127 X |
| 1,246,189 | 11/1917 | Vonderlip | 406/193 X |
| 1,861,314 | 5/1932 | McAndrew | 285/127 X |
| 2,428,381 | 10/1947 | Purry | 285/127 X |
| 2,911,235 | 11/1954 | Stumbough | 285/127 X |

Primary Examiner—Dave W. Arola
Attorney, Agent, or Firm—Leon Gilden

[57] ABSTRACT

A conduit structure including a first conduit pipe in fluid communication with a second conduit pipe. The first conduit pipe is defined by a first axis, with a bull head pipe extending beyond the second conduit defined by a third axis parallel to and offset relative to the first axis of the first conduit to accommodate debris and abrasive material minimizing damage to the elbow association of the first and second conduit. A modification of the invention includes the use of a modified bull head pipe, including a manually reciprocatable piston mounted within the pipe to effect periodic discharge of debris accumulated within the modified bull head pipe.

2 Claims, 4 Drawing Sheets

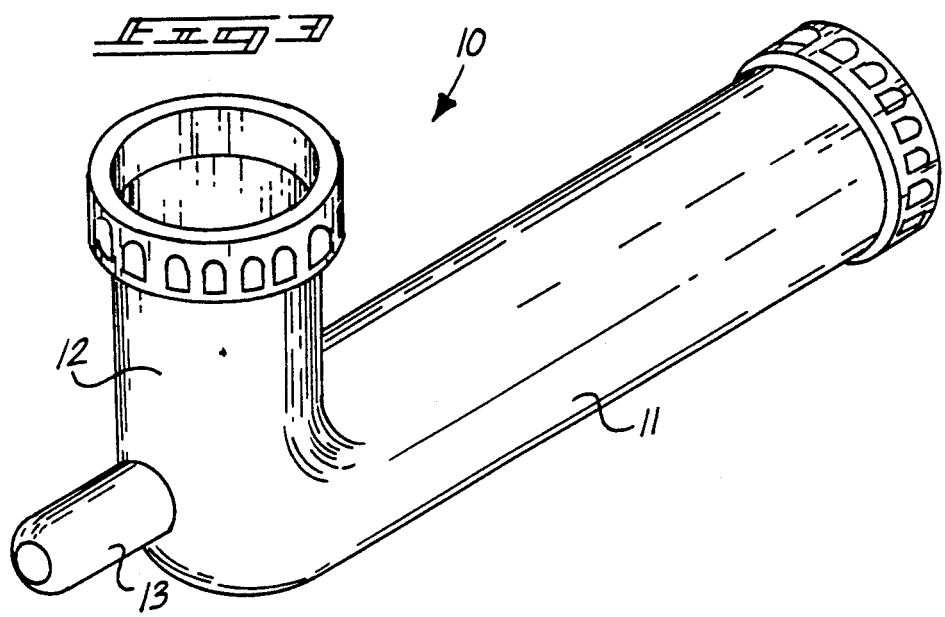
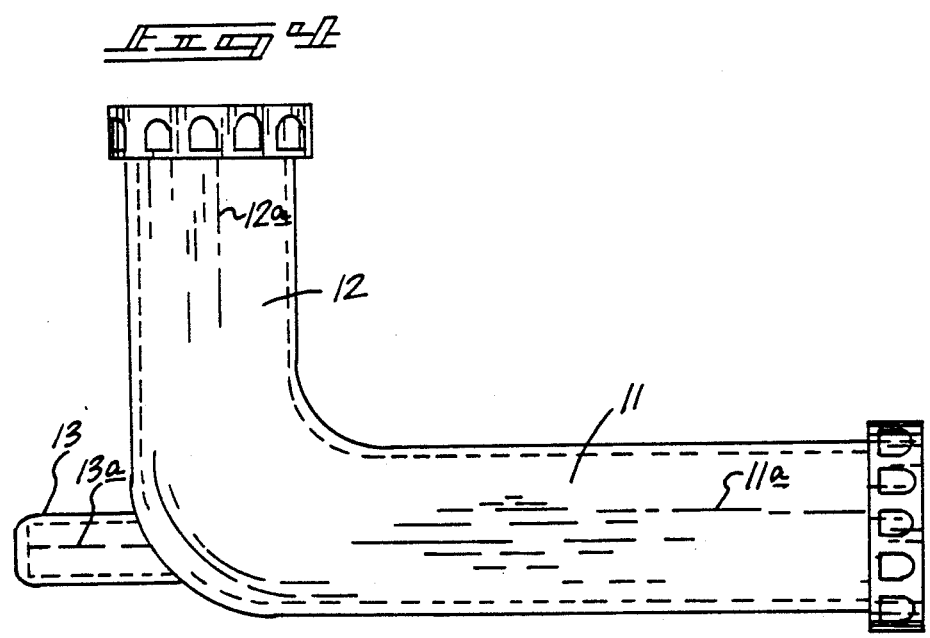

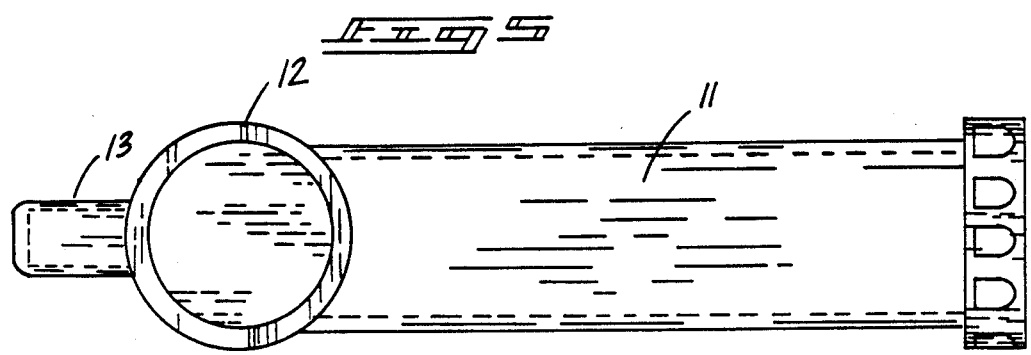
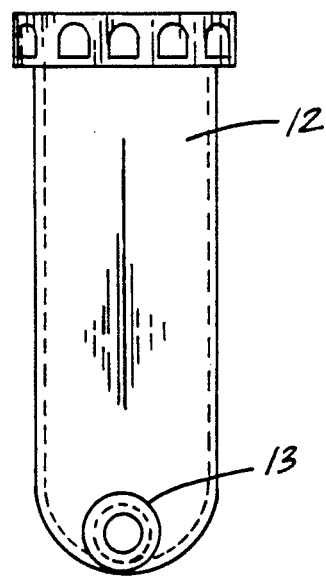

EROSION RESISTANT ELBOW CONDUIT

BACKGROUND OF THE INVENTION

1. Field of the Invention

The field of invention relates to conduit elbow structure, and more particularly pertains to a new and improved erosion resistant elbow conduit for use in transport of fluid to minimize abrasive wear by providing accommodation of abrasive material within the elbow structure within an associated bull head pipe.

2. Description of the Prior Art

In fluid flow of various materials such as in gas, oil, and the like, abrasive particles at elevated velocities are directed through the elbow and effect erosion within the elbow due to successive contact with interior surfaces of the elbow structure prior art organizations provide structure to effect cleaning of the elbow pipe and the like, but have heretofore not been arranged and configured to accommodate abrasive material in a manner as set forth by the instant invention. Examples of prior art structure may be found in U.S. Pat. No. 4,179,762 to Barnhardt, et al. wherein an elbow structure utilizes a removable drain trap that includes a filter member positionable within the elbow to provide filtration of debris within fluid flow within the elbow structure.

U.S. Pat. No. 4,031,914 to Neri provides a sink trap utilizing a branch pipe mounted to the elbow organization to provide a removable cap to the branch pipe to permit a flushing of the elbow through access of the branch pipe.

U.S. Pat. No. 4,301,554 to Wojacicki provides a drain trap with a removable tray mounted within the elbow structure to accommodate various debris deposited within the elbow organization.

U.S. Pat. No. 3,954,116 to Guth, et al. wherein an elbow structure includes a tongue like projection that is pivotally mounted to effect a sound barrier when the elbow structure is utilized in association with a pump organization.

U.S. Pat. No. 4,164,048 to Kampfer provides a drain trap with an access port arranged at an oblique angle relative to the elbow construction to provide access to the elbow to perform periodic maintenance and cleaning of the elbow organization.

As such, it may be appreciated that there continues to be a need for a new and improved erosion resistant elbow conduit wherein the same addresses both the problems of ease of accommodation within a fluid flow system, as well as effectiveness in construction and in this respect, the present invention substantially fulfills this need.

SUMMARY OF THE INVENTION

In view of the foregoing disadvantages inherent in the known tYpes of elbow construction now present in the prior art, the present invention provides an erosion resistant elbow conduit wherein the same utilizes a bull head pipe mounted in parallel alignment and fluid communication with a conduit of a multi-conduit elbow joint to accommodate corrosive and abrasive debris within the elbow organization. As such, the general purpose of the present invention, which will be described subsequently in greater detail, is to provide a new and improved erosion resistant elbow conduit which has all the advantages of the prior art elbow conduit construction and none of the disadvantages.

To attain this, the present invention provides a conduit structure including a first conduit pipe in fluid communication with a second conduit pipe, the first conduit pipe is defined by a first axis, with a bull head pipe extending beyond the second conduit defined by a third axis parallel to and offset relative to the first axis of the first conduit to accommodate debris and abrasive material minimizing damage to the elbow association of the first and second conduit A modification of the invention includes the use of a modified bull head pipe, including a manually reciprocatable piston mounted within the pipe to effect periodic discharge of debris accumulated within the modified bull head pipe.

My invention resides not in any one of these features per se. but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved erosion resistant elbow conduit which has all the advantages of the prior art elbow conduit constructions and none of the disadvantages.

It is another object of the present invention to provide a new and improved erosion resistant elbow conduit which may be easily and efficiently manufactured and marketed.

It is a further object of the present invention to provide a new and improved erosion resistant elbow conduit which is of a durable and reliable construction.

An even further object of the present invention is to provide a new and improved erosion resistant elbow conduit which is susceptible of a low cost of manufacture with regard to both materials and labor, and which accordingly is then susceptible of low prices of sale to the consuming public, thereby making such erosion resistant elbow conduits economically available to the buying public.

Still yet another object of the present invention is to provide a new and improved erosion resistant elbow conduit which provides in the apparatuses and methods of the prior art some of the advantages thereof, while simultaneously overcoming some of the disadvantages normally associated therewith.

Still another object of the present invention is to provide a new and improved erosion resistant elbow conduit wherein the same provides a combination of abrasive components within a fluid flow environment of an elbow conduit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic side view, taken in elevation, of the instant invention.

FIG. 5 is an orthographic top view of the instant invention.

FIG. 6 is an orthographic end view, taken in elevation, of the instant invention.

DESCRIPTION OF THE PREFERRED EMBODIMENT

Figure 1:
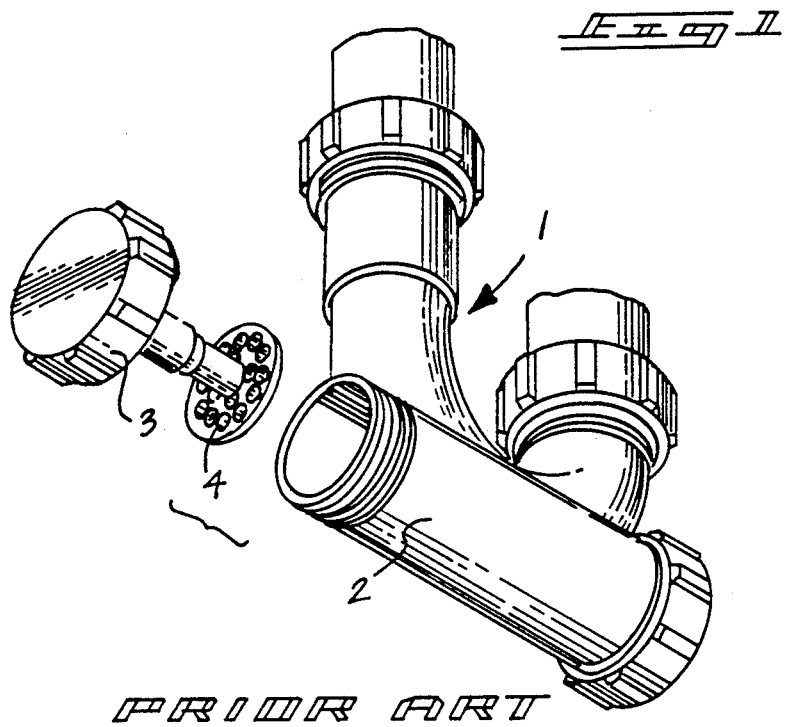
FIG. 1 is an isometric illustration of a prior art elbow organization.

With reference now to the drawings, and in particular to FIGS. 1 to 8 thereof, a new and improved erosion resistant elbow conduit embodying the principles and concepts of the present invention and generally designated by the reference numerals 10 and 10a will be described.

Figure 2:
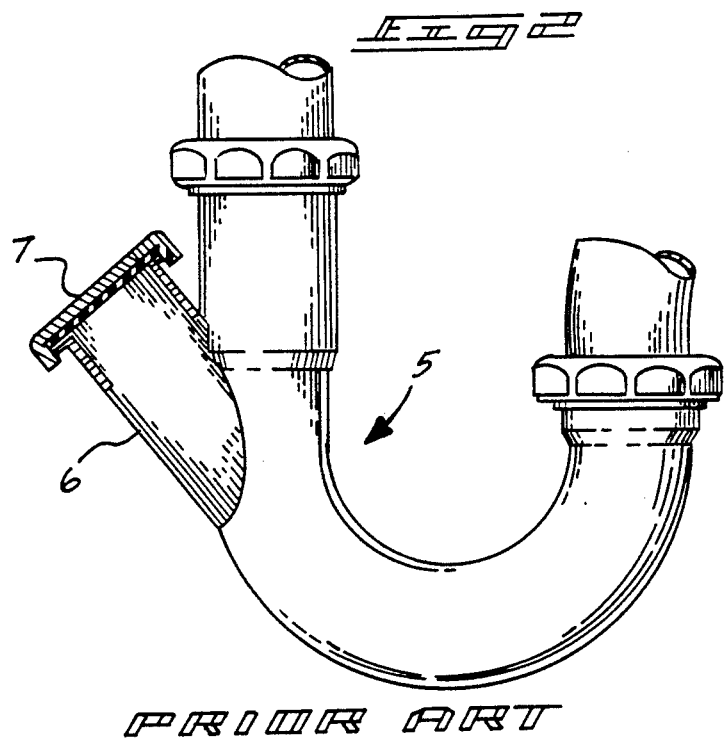
FIG. 2 is an orthographic side view, taken in elevation, of a further prior art elbow construction.

FIG. 1 illustrates a prior art conduit construction 1, wherein a base conduit 2 includes a cap 3 to provide access to the conduit 2 for purposes of maintenance and cleaning, wherein the cap includes an integral filter plate 4 positionable within the base conduit 2 to filter various particulates directed through the base conduit. FIG. 2 illustrates a further prior art elbow construction 5, wherein a branch elbow 6 includes a removable cap 7 to provide access to the elbow construction for maintenance and cleaning thereof.

More specifically, the erosion resistant elbow conduit 10 of the instant invention essentially comprises a first coaxially aligned conduit 11 in fluid communication with a second conduit 12, wherein the second conduit 12 is defined by a second axis 12a angularly oriented relative to the first conduit defined by a first axis 11a. A bull head pipe 13 projects beyond the first conduit 11 and is in fluid communication therewith and defines a cavity therewithin, and further the bull head pipe 13 includes a third axis 13a that is parallel to and offset relative to the first axis 11a. During flow of various fluid components through the elbow construction 10, abrasive material is directed therethrough, whereupon impact in the elbow of the fluid junction of the first and second conduits, erosion typically is effected. The bull head pipe 13 in alignment with fluid flow through the first conduit 11 accommodates the debris or abrasive particles therewithin the aforenoted cavity. The bull head pipe 13 is defined by a predetermined internal diameter substantially equal to one-half of a first diameter defined by the first conduit 11. Typically, the first conduit 11 and the second conduit 12 are defined by an equal first diameter, as illustrated.

Figure 7:
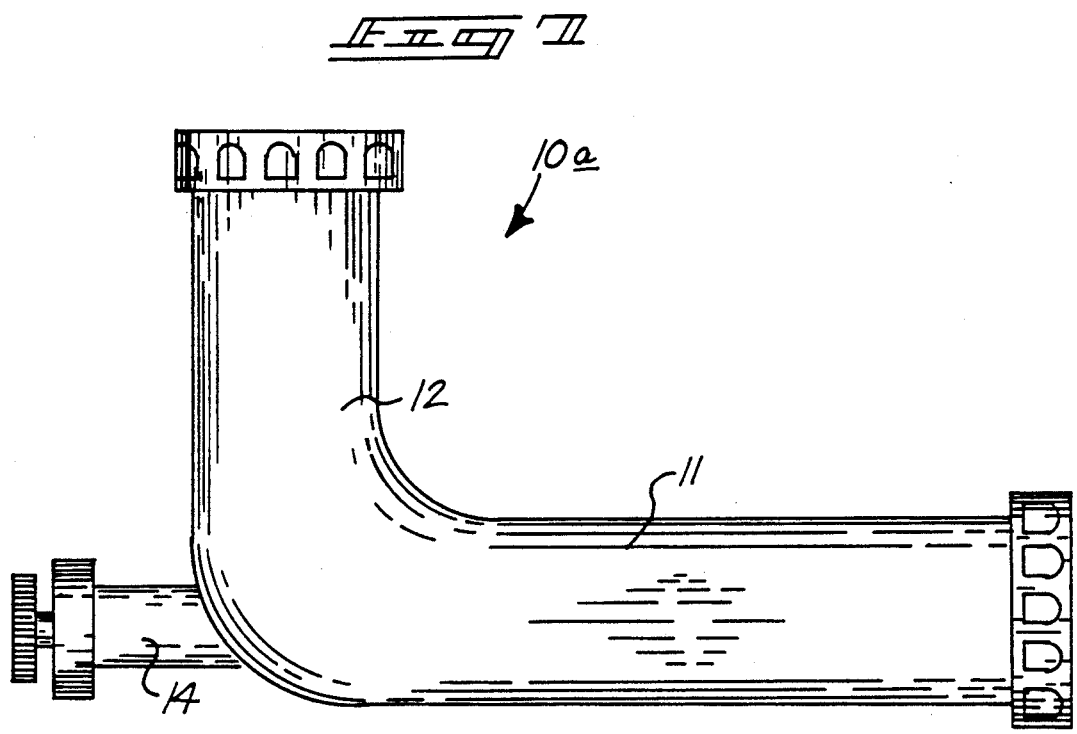
FIG. 7 is an orthographic side view of a modified conduit utilized by the instant invention.
Figure 8:
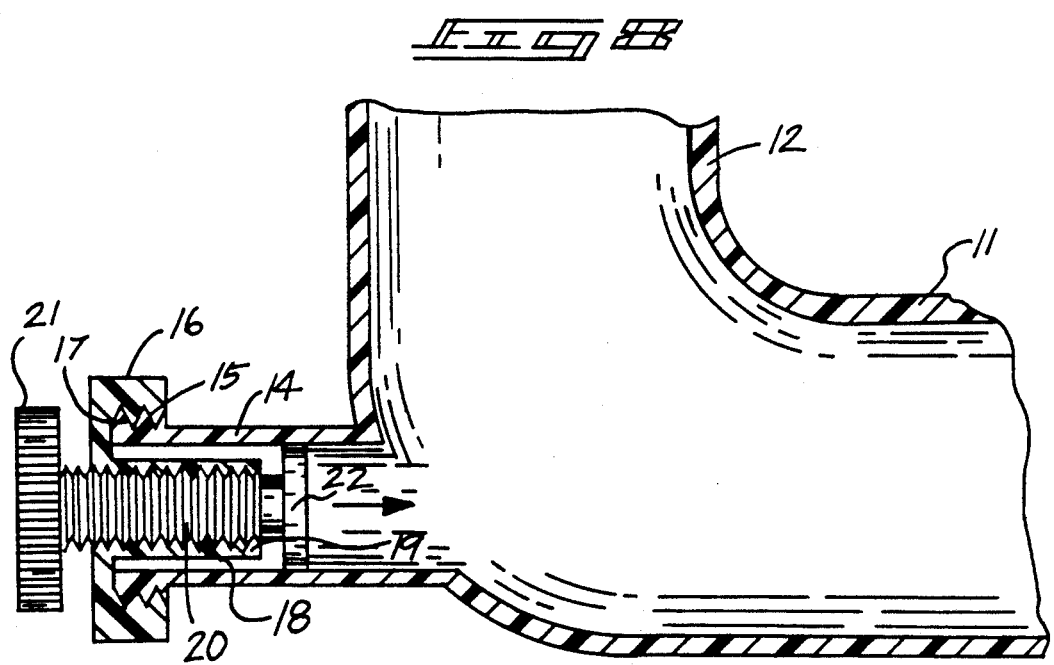
FIG. 8 is an orthographic cross-sectional illustration of the modified elbow conduit utilized by the instant invention.

FIGS. 7 and 8 illustrate a modified elbow construction 10a, wherein a modified bull head pipe 14 is defined by the aforenoted predetermined internal diameter and an included axis parallel to and offset relative to the first axis of the first conduit 11, in a manner as described above. The bull head pipe includes a threaded outer end 15 to receive a sealing cap 16 that includes first threads 17 to cooperate with the threaded outer end 15. The coaxially aligned tube 18 is integrally formed relative to the cap 16 and extends interiorly of the modified bull head pipe 14 a distance substantially less than a predetermined length defined by the modified bull head pipe 14. The tube 18 includes second threads 19 formed therein to cooperate with an externally threaded boss 20. The externally threaded boss 20 is defined by a boss diameter less than that of a head member 21 integrally and orthogonally mounted relative to the externally threaded boss exteriorly of the cap 16. The externally threaded boss 20 includes a piston 22 mounted at a forward end thereof remote from the head member 21, wherein the piston 22 is defined by a piston diameter substantially equal to the internal diameter of the externally threaded boss 14, whereupon periodic accumulation of debris within the modified bull head pipe 14 may be discharged by projecting the boss 21 and the associated piston 22 through and interiorly of the bull head pipe 15 to direct such material into the junction defined by the first and second conduits 12, where it may be harmlessly discharged past the elbow construction of the instant invention. Accordingly, the threaded boss 20 should define a predetermined length substantially equal to a predetermined length defined by the modified bull head pipe 14 to permit directing of the piston 22 throughout the predetermined length of the bull head pipe 13 to effect its discharge of material accumulated therewithin.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An erosion resistant elbow conduit comprising, in combination,
   a first longitudinally aligned conduit defined by a first diameter, and a first axis in fluid communication with a second conduit, wherein the second conduit is defined by a second axis and a second diameter, wherein the first axis is angularly oriented relative to the second axis, and
   a bull head pipe in fluid communication with the first conduit projecting beyond the first conduit, wherein the bull head pipe is defined by a third axis and defined by a predetermined internal diameter, and
   wherein the bull head pipe predetermined internal diameter is substantially equal to one-half the first diameter defined by the first conduit, and
   wherein the third axis is parallel to and offset relative to the first axis, and
   wherein the first diameter is substantially equal to the second diameter, and
   wherein the bull head pipe is defined by a predetermined length, and includes a cap mounted to the bull head pipe spaced from the first conduit, and the cap includes a tube orthogonally and integrally mounted to the cap projecting interiorly of the bull head pipe a predetermined distance less than the predetermined length, and the tube includes internal threads formed therethrough, and an externally threaded boss positioned within said bull head pipe, wherein the internal threads cooperate with said externally threaded boss, the externally threaded boss is defined by a boss length substantially equal to the predetermined length, and the boss includes a head member mounted at a forward end of the boss exteriorly of the bull head pipe and includes a piston member mounted integrally and orthogonally to the boss interiorly of the bull head pipe.

2. An apparatus as set forth in claim 1 wherein the piston is defined by a piston diameter substantially equal to the predetermined internal diameter of the bull head pipe.

* * * * *